United States Patent
Anderson

(10) Patent No.: US 7,210,061 B2
(45) Date of Patent: Apr. 24, 2007

(54) DATA REDUNDANCY FOR WRITES USING REMOTE STORAGE SYSTEM CACHE MEMORY

(75) Inventor: Eric Anderson, Palo Alto, CA (US)

(73) Assignee: Hewlett-Packard Development, L.P., Houston, TX (US)

( * ) Notice: Subject to any disclaimer, the term of this patent is extended or adjusted under 35 U.S.C. 154(b) by 496 days.

(21) Appl. No.: 10/418,409

(22) Filed: Apr. 17, 2003

(65) Prior Publication Data

US 2004/0210795 A1 Oct. 21, 2004

(51) Int. Cl.
*G06F 11/16* (2006.01)
*G06F 12/16* (2006.01)

(52) U.S. Cl. ............... 714/7; 714/5; 714/6; 711/162
(58) Field of Classification Search ............... None
See application file for complete search history.

(56) References Cited

U.S. PATENT DOCUMENTS

| | | | | |
|---|---|---|---|---|
| 4,429,366 | A | * | 1/1984 | Kennon ............... 700/292 |
| 5,588,110 | A | * | 12/1996 | DeKoning et al. ............ 714/5 |
| 5,617,530 | A | * | 4/1997 | Stallmo et al. ............... 714/6 |
| 5,640,530 | A | * | 6/1997 | Beardsley et al. .......... 711/113 |
| 5,742,792 | A | * | 4/1998 | Yanai et al. ............... 711/162 |
| 6,006,342 | A | | 12/1999 | Beardsley et al. |
| 6,105,116 | A | * | 8/2000 | Mori ........................ 711/162 |
| 6,205,481 | B1 | * | 3/2001 | Heddaya et al. ............ 709/226 |
| 6,378,037 | B1 | | 4/2002 | Hall |
| 6,467,048 | B1 | | 10/2002 | Olarig et al. |
| 6,647,474 | B2 | * | 11/2003 | Yanai et al. ............... 711/162 |
| 6,681,339 | B2 | * | 1/2004 | McKean et al. ............... 714/5 |
| 6,952,737 | B1 | * | 10/2005 | Coates et al. ............... 709/229 |
| 7,039,829 | B2 | * | 5/2006 | Duncan ....................... 714/6 |
| 7,162,587 | B2 | * | 1/2007 | Hiken et al. ............... 711/135 |
| 2003/0145257 | A1 | * | 7/2003 | Fields et al. ............... 714/704 |
| 2004/0024962 | A1 | * | 2/2004 | Chatterjee et al. .......... 711/114 |

OTHER PUBLICATIONS

Google Definition of "Data Mirroring" from Blanka Presents Network Jargon http://www.angelfire.com/anime3/internet/network.htm.*

(Continued)

*Primary Examiner*—Scott Baderman
*Assistant Examiner*—Joseph Schell

(57) ABSTRACT

A technique for using a remote array cache memory for data redundancy. A computer system includes a first storage system having cache memory and mass storage. Data to be written to the mass storage is written to the cache memory. Redundant data is stored elsewhere in case the cache experiences a fault before the data can be written to mass storage. Otherwise, data not yet written to the mass storage may be lost. The first storage system is in communication with a second storage system which is typically located remotely from the first storage system. When the first storage system receives a write request, the first storage system forwards the data to the second storage system for redundant storage. Where the data is forwarded to the second storage system, this is referred to herein as "remote mode." The first storage system may include redundant cache memories and enters remote mode only in the event a fault affects one of the cache memories. The data can then be recovered from the second storage system if needed.

22 Claims, 5 Drawing Sheets

OTHER PUBLICATIONS

Wikipedia's Cache Article version from Apr. 6, 2003, http://en.wikipedia.org/w/index.php?title=Cache&oldid=883630.*

"RAPID-Cache—A Reliable and Inexpensive Write Cache for Disk I/O Systems", Yiming Hu, Qing Yang, and Tycho Nightengale. 5th International Symposium on High Performance Computer Architecture (HPCA-5), Orlando, FL, Jan. 1999. New York: IEEE, 1999. 204-213.

"AFRAID—A Frequently Redundant Array of Independent Disks", Stefan Savage and John Wilkes. Proceedings of the USENIX 1996 Annual Technical Conference, San Diego, CA, Jan. 22-26, 1996. USENIX: Berkeley, 1996.

"Implementation of a Reliable Remote Memory Pager", Evangelos P. Markatos and George Dramitinos. Proceedings of the USENIX 1996 Annual Technical Conference, San Diego, CA, Jan. 22-26, 1996. USENIX: Berkeley, 1996.

"Cooperative Caching: Using Remote Client Memory to Improve File System Performance." Michael D. Dahlin, Randolph. Y. Wang, Thomas E. Anderson and David A. Patterson. USENIX 1994 Operating Systems Design and Implementation Proceedings (OSDI 1994), Monterey, CA, Nov. 14-17, 1994. USENIX: Berkeley, 1996.

"Replication in the Harp File System." Barbara Liskov, Sanjay Ghemawat, Robert Gruber, Paul Johnson, Liuba Shrira, Michael Williams. Proceedings of the 13th Symposium on Operating System Principles, (SOSP '91), Pacific Grove, CA, Oct. 1991. New York: ACM Press, 1991, 226-238.

"An Exploration of Network Ram." Eric A. Anderson, Jeanna M. Neefe, U.C. Berkeley CS Technical Report CSD-98-1000, Dec. 9, 1994. University of California, Berkeley. < http://www.cs.berkeley.edu/ eanders/projects/netram/cs252.ps>.

* cited by examiner

DATA REDUNDANCY FOR WRITES USING REMOTE STORAGE SYSTEM CACHE MEMORY

BACKGROUND OF THE INVENTION

1. Field of the Invention

The present invention relates to the field of data storage systems and, more particularly, to coping with faults affecting write caching of data in a data storage system.

2. Description of the Related Art

A typical data storage system includes a controller for controlling operation of the storage system, a cache memory and a mass storage medium, such as hard disk drives. The cache memory serves as a buffer for read and write operations. More particularly, when a host system sends a write request for storing data in the storage system, the data is first stored redundantly in the cache memory, the storage system sends a response to the host, and later the data can be written asynchronously to the mass-storage medium while new requests can continue to be received into the cache memory.

For coping with faults, data storage systems are usually equipped with two caches and two or more redundant controllers. Therefore, where a fault occurs that affects one of the controllers or cache memories, a remaining one can continue to function. Thus, when the host system sends data to be stored by the storage system, the data is stored in both cache memories. Then, if a fault occurs that affects one of the cache memories, the data can be obtained from the remaining cache memory.

Once a fault occurs that affects one of the cache memories, another fault could then occur that affects the remaining cache memory. This could result in the permanent loss of data in cache memory that has not yet been written to the mass storage. Therefore, upon the occurrence of a failure that affects one of the cache memories, a conventional data storage system enters "safe mode" in which the data for each write request is immediately written to the mass storage before the response is sent to the host. This minimizes the amount of data that would be lost in the event a fault affects the remaining cache memory. Unfortunately, operation in safe mode also reduces the rate at which the data storage system is able to process requests. This is because disk access times tend to take longer than writes to cache and the ability to reorder the requests for increasing the efficiency of disk accesses is lost. In some circumstances, the performance can be degraded to the point that the storage system is unable to keep up with demand and has, thus, lost its usefulness.

This problem is exacerbated in some storage systems in which each controller is paired with a cache memory and often located on the same printed circuit board. In this case, a fault affecting any of the controllers or boards is likely to affect at least one of the cache memories, necessitating entry into safe mode. For such systems, the likelihood of having to enter safe mode can be significant.

Therefore, what is needed is an improved technique for coping with faults affecting cache memory in a data storage system. It is to this end that the present invention is directed.

SUMMARY OF THE INVENTION

The present invention is a technique for using a remote array cache memory for data redundancy. In one aspect, a request is received to write data at a first storage system having mass storage and at least two cache memories. When one of the cache memories of the first storage system is affected by a fault, the data is stored in the other one of the cache memories and redundant data is forwarded to a remote storage location. Otherwise if neither of the cache memories of the first storage system has experienced a fault, the data is stored in one of the cache memories and the redundant data is stored in the other one of the cache memories. The remote storage location may be in a second storage system. Additional redundant data may be forwarded to a third storage system, so that the redundant data and the additional redundant data are distributed among a plurality of storage systems. The first storage system may be configured for storing the redundant data at the remote location prior to said receiving the request (e.g., by storing an identification of the remote location in the mass storage of at the first storage system).

The first storage system may write the data to its mass storage after receiving a reply from the remote storage location. The first storage system may send a notification to the remote storage location for deletion of the redundant data after the data has been written to the mass storage of the first storage system. After detecting the fault, a record may be stored in the mass storage of the first storage system indicating entry into remote mode. The redundant data may be recovered from the remote location. If necessary recovering the redundant data may be performed by reading the record in the mass storage and retrieving the redundant data from the remote location.

These and other aspects of the invention are described in more detail herein.

DETAILED DESCRIPTION OF A PREFERRED EMBODIMENT

The present invention provides a technique for using a remote storage system cache memory for data redundancy. A computer system includes a first storage system that has a cache memory and mass storage (e.g., a disk drive). Data to be written to the mass storage is first stored in the cache memory. Data that is redundant to the data in the cache memory is stored elsewhere in the computer system in case the cache experiences a fault before the data can be written to the mass storage. Otherwise, any data stored in the cache memory that has not yet been written to the mass storage may be lost. In accordance with the invention, the first storage system is in communication with a second storage system which is typically located remotely from the first storage system. By "remotely" what is meant is that the storage systems preferably do not share common elements, though they may be physically located in proximity to each other, such as in a common machine room. However, the storage systems may be located more distant from each other, such as within a metropolitan area network. While the storage systems may be more distant from each other, such as within a wide area network, such an embodiment may require provisions, such as data compression, for coping with greater communication latencies.

When the first storage system receives a write request, the first storage system forwards the data to a second storage system for redundant storage therein. Where the data is forwarded to a second storage system, this is referred to herein as "remote mode." The data can then be recovered from the second storage system if needed. In a preferred embodiment, the first storage system includes redundant cache memories and enters remote mode only in the event a fault affects one of the cache memories.

The invention can be applied to any computer system having a storage system and a remote storage location and is particularly useful for computer systems having two or more storage systems. Advantageously, the invention avoids the need for a storage system to enter conventional safe mode which can result in significant performance degradation. Rather, the remote mode of the present invention allows the storage system to continue to operate asynchronously so that storage requests can continue to be received while prior requests are still being written to the mass storage. Further, because storage systems are often deployed in multiples, implementation of the present invention does not require additional hardware, such as an auxiliary storage device.

Figure 1:
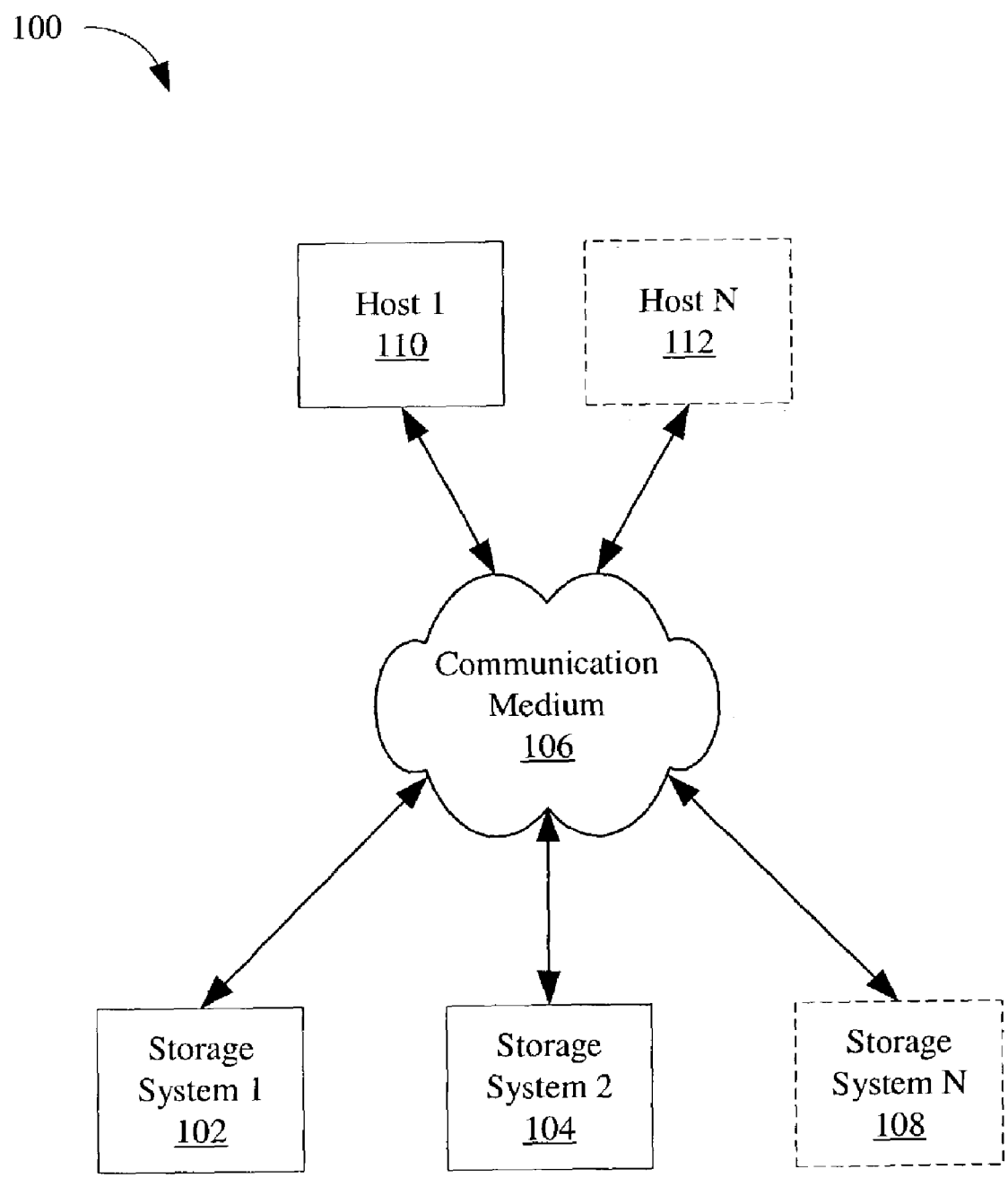
FIG. 1 illustrates a schematic block diagram of a computer system by which the present invention may be implemented.

FIG. 1 illustrates a schematic block diagram of a computer system 100 by which the present invention may be implemented. The system 100 includes a first storage system 102, a second storage system 104 and a communication medium 106 by which the storage systems 102 and 104 may communicate with each other. For example, the communication medium 106 may be implemented as part of a network or some other communication medium such as a bus. The system 100 may include any number of additional storage systems, such as storage system 108, and any number of host systems, such as host systems 110 and 112. The connections between the various components shown in FIG. 1 are purely exemplary; any other topology may be used, including direct connections, multiple networks, multiple network fabrics, and so forth.

One or more applications operating at the host system 110 (and, possibly, host system 112) may access the first data storage system 102 for performing write or read transactions to or from data objects, such as files or blocks, stored at the storage system 102. More particularly, the host 110 may retrieve a copy of a data object by issuing a read request to the storage system 102. Also, when a data object at the host 110 is ready for storage at the storage system 102, the host 110 may issue a write request to the storage system 102. For example, the host 110 may request storage of a file undergoing modification by the host 110.

Figure 2:
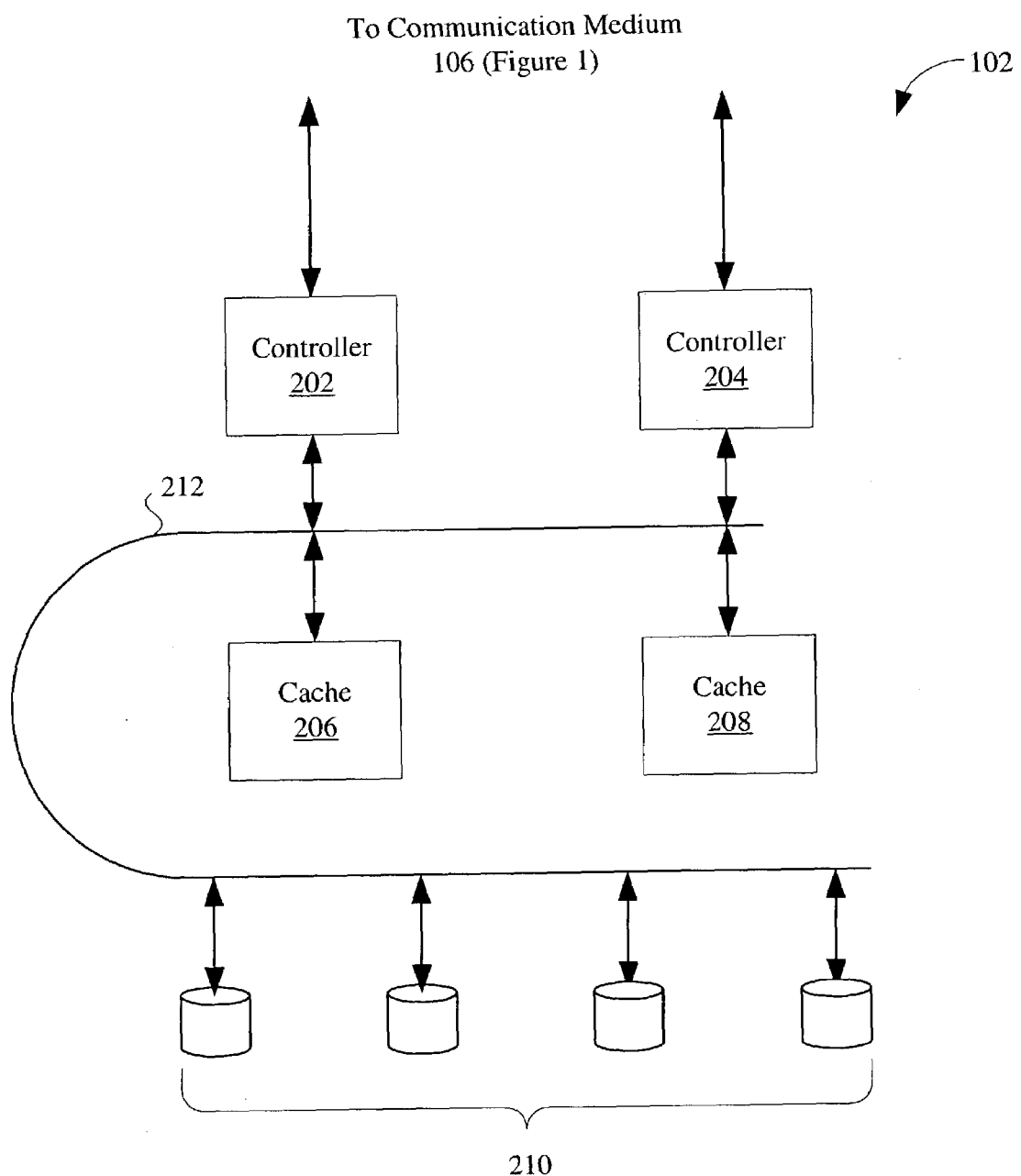
FIG. 2 illustrates a schematic block diagram of a storage system which may be included in the computer system of FIG. 1.

FIG. 2 illustrates an exemplary embodiment of the storage system 102 of FIG. 1 in more detail. While details of the storage system 102 are shown, the storage systems 104 and 108 may be identical to the storage system 102, though this is not necessary.

Preferably, the storage system 102 includes at least two redundant controllers 202 and 204. Thus, each controller 202 and 204 is able to control operation of the storage system 102 in the event of a failure of the other. The controllers 202 and 204 receive storage requests, e.g., read and write requests from the host 110, and send responses to the requests. In addition, the controllers 202 and 204 are preferably able to communicate with each other to determine, for example, the operational status of the other, as explained in more detail herein. Each controller 202 and 204 preferably includes an interface for sending and receiving communications to and from other elements of the system 100 (FIG. 1) via the communication medium 106 (FIG. 1). Accordingly, these interfaces may be adapted to the particular communication characteristics of the communication medium 106, such as an appropriate communication protocol. In an alternate embodiment, a single interface or even multiple interfaces, may be shared by multiple controllers, such as the controllers 202 and 204.

The storage system 102 also preferably includes at least two redundant cache memories 206 and 208 and mass storage 210. Communications within the storage system 102 may be via a communication medium 212, which may be implemented as bus structure, network or any other type of communication medium. Data to be written to the storage system 102 is received into at least one of the cache memories (e.g., cache memory 206) and data that is redundant of that data is stored elsewhere in the system 100 (FIG. 1), such as in the other one of the cache memories (e.g., cache memory 208) or in one or more other storage systems (e.g., in the second storage system 104). Additional controllers or cache memories may also be present. Preferably, the cache memories 206 and 208 include non-volatile memory (e.g., NVRAM or use of back-up power supply) so that data is not lost in the event of a loss of power. Controller 202 may access cache memories 206 and 208 directly or cache memory may be associated with a controller such that controller 202 can only access cache 204 through controller 204.

The data is then stored in the mass storage 210. The mass storage 210 may implemented by one or more disk drives or by some other mass storage medium, such as one or more magnetic tape drives, etc. Because the data is stored redundantly before it is written to the mass storage 210, writing to the mass storage 210 can be performed asynchronously without danger that the data will be lost if a fault occurs that affects the cache memory (e.g., cache memory 206) before all the data in the cache has been written to the mass storage 210. One or more mass storage controllers may be present that, for example, perform RAID accesses to the mass storage.

Preferably, the storage system 102 includes redundant cache memories 206 and 208. In this case, data to be written to the mass storage 210 is stored redundantly by the cache memories 206 and 208. Thus, if a fault affects one of the cache memories 206 or 208 before it is written to the mass storage 210, the data can be obtained from the remaining cache memory 206 or 208 and stored in the mass storage 210. When a fault affects one of the cache memories 206 or 208, the data is stored in the unaffected cache memory and is also stored redundantly elsewhere in the system 100, such as in the storage system 104 (FIG. 1), at least until the data is written to the mass storage 210. Preferably, the redundant data is stored in non-volatile memory, such as NV-RAM. Storing of the redundant data elsewhere in the system is referred to as "remote mode." In a preferred embodiment, the remote mode is entered only in the event a fault affects one of the cache memories 206 or 208.

It will be apparent that modifications can be made to the storage system 102. For example, the storage system 102 as shown is essentially implemented as a disk array. However, the storage system 102 may alternately be implemented as a network file server (NFS), database server, and so forth.

Figure 3:
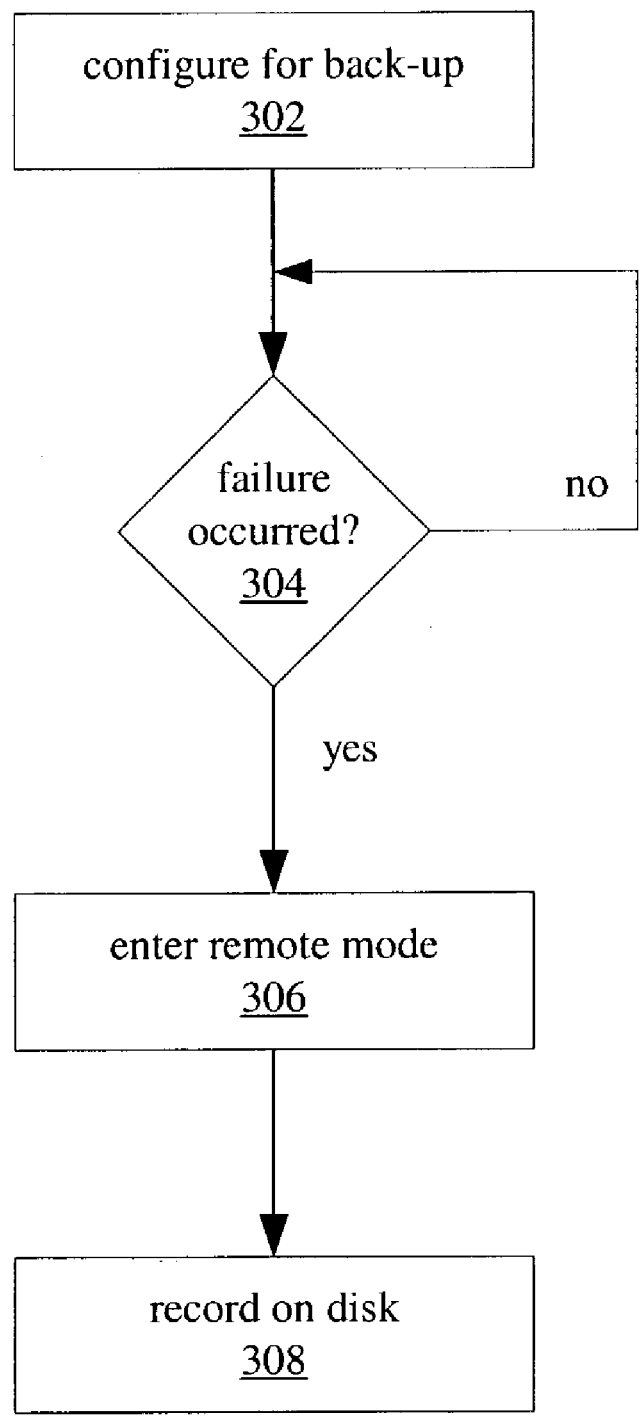
FIG. 3 illustrates a flow diagram of a failover method in accordance with an aspect of the present invention.

FIG. 3 illustrates a flow diagram of a failover method 300 in accordance with an aspect of the present invention. The method 300 provides a technique for entry into remote mode. In a step 302, the storage system 102 is configured to use remote storage, e.g., storage system 104 (FIG. 1), for redundant storage of data held in cache memory at the storage system 102 in the event a fault occurs that affects one of the cache memories 206 or 208, and, thus, prevents the redundant data from being stored locally. The configuring performed in step 302 generally includes identifying one or more remote locations (locations other than the storage system 102) in which the redundant data may be stored in the event of a failure. For example, this may be performed manually by a system administrator providing the storage system 102 with the network address of the storage system 104. Alternately, the storage system 102 may be able to determine automatically (i.e. without a human providing the identity) the identities of other suitable entities that it is able to communicate with by using an appropriate network protocol (e.g., a broadcast location service). The identity of the remote location is preferably stored at a predetermined location in the mass storage 210 so that it will be accessible in the event a fault affects the cache memories 206 and 208.

In a step 304, the storage system 102 responds to storage requests, including storing data to be written to the mass storage 210 redundantly in the two cache memories 206 and 208. The storage system 102 may also monitor for a fault that affects one of the cache memories 206 or 208. This may be accomplished, for example, by determining that a fault has occurred when one of the cache memories is non-responsive or provides a faulty response when an attempt is made to store data in the cache or to retrieve data from the cache.

When such a fault is detected, remote mode is entered in a step 306. In a step 308, the storage system 102 may store an indication that it has entered remote mode in a place other than the remaining cache memory (e.g., at a predetermined location in the mass storage 210). As explained herein, this indication will be useful in the event recovery of the redundant data from the remote location become necessary, e.g., in the event another failure affects operation of the system 102.

Once remote mode has been entered, the data to be stored in the storage system 102 is stored in the remaining one of the cache memories 206 or 208 that is still functional, while redundant data is forwarded to remote storage identified in step 302. Operation in remote mode is described in more detail with reference to FIG. 4.

Figure 4:
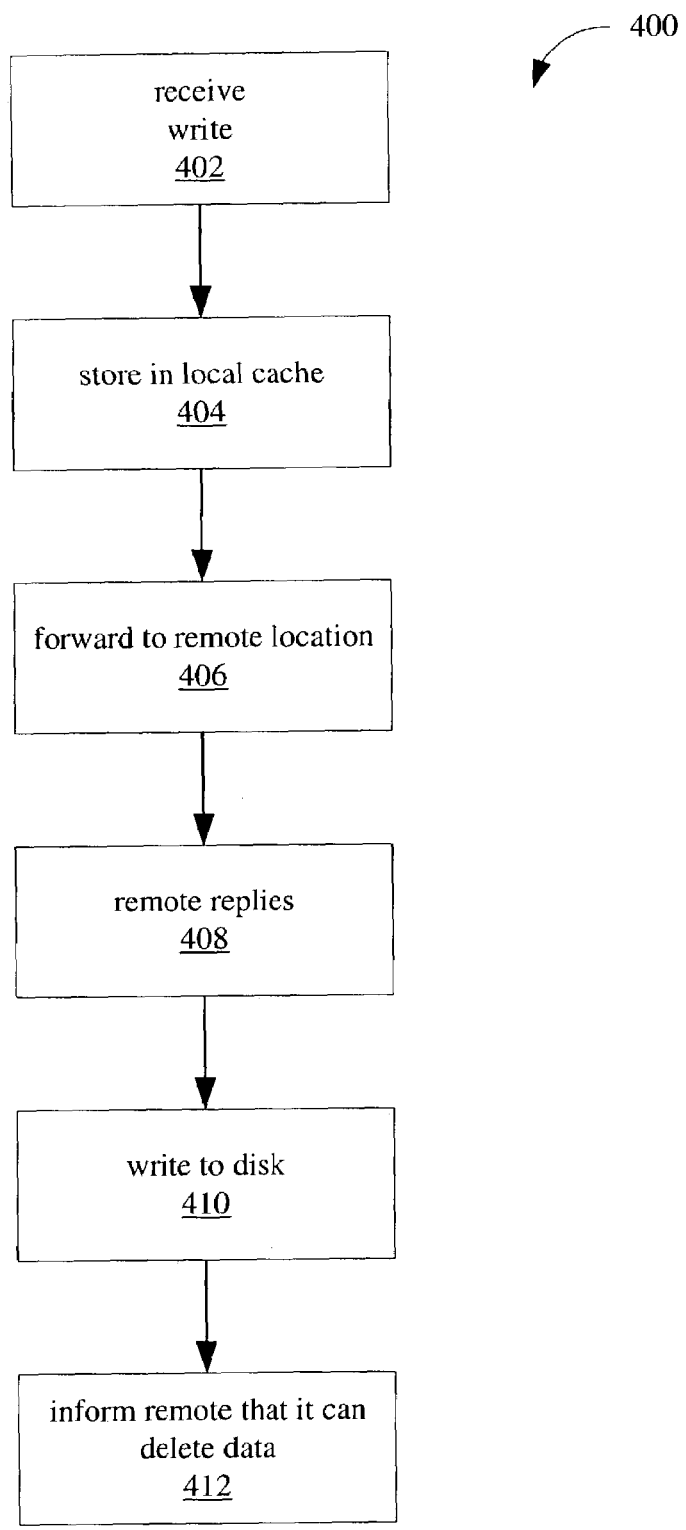
FIG. 4 illustrates a flow diagram of a method for using a remote storage system cache memory in accordance with an aspect of the present invention.

FIG. 4 illustrates a flow diagram of a method 400 for using a remote storage system cache memory for storing redundant data. The method 400 may be performed for each write request received by the storage system 102 after remote mode has been entered in step 306 of FIG. 3. In a step 402, a write request is received by the storage system 102, e.g., from the host 110. Then, in a step 404, the data to be written in response to the write request is stored in the local cache memory, i.e. the one of the cache memories 206 and 208 that is still functional. In addition, redundant data is forwarded to a remote location in step 406. In the example, the redundant data is stored in cache memory at the storage system 104, which would have been identified in step 302 of FIG. 1. Note that the invention is not limited to the ordering of steps disclosed herein; for example, steps 404 and 406 may be performed in another order or in parallel.

In step 408, the remote storage system 104 may reply to the local storage system 102 that the redundant data has been successfully received. Preferably, the storage system 102 waits for this reply before sending a response to the write (e.g., from host 110) so as to minimize the potential data loss should a fault occur which prevents the remote storage system 104 from successfully storing the redundant data. Alternatively, the storage system 102 may send a write response without a reply from the remote system 104. However, if the redundant data is not successfully received by the remote system 104 and a fault occurs at the local system 102, data may be unrecoverable from either location.

In a step 410, the data in the functional one of the cache memories 206 or 208 is written to the mass storage 210. Because the data has been stored redundantly, the remote mode of the present invention allows the storage system 102 to operate asynchronously, such that write responses can be sent while prior requests are still being written to the mass storage 210.

Once the data has been written to the mass storage 210, it is no longer necessary to retain the redundant copy at the remote location which, in the example, is the storage system 104. Accordingly, the storage system 102 may then notify the remote system 104 in step 412 that the data can be deleted (i.e. its storage locations can be made available to be overwritten by new data). However it is not necessary that a separate notification be sent for each write request. Rather, to reduce communication traffic between the storage systems 102 and 104, the storage system 102 may send a single notification that corresponds to multiple write requests.

Further, to conserve space in the cache memory of the remote system 104, the redundant data need not held in the cache memory until it is deleted. Rather, the data can be transferred from cache to mass storage at the remote system 104. While it could be expected to take longer to recover that data from mass storage in the event it is needed, it is expected that the need to recover the data would occur infrequently, so as to justify the benefit of requiring less space in cache memory. The data can be written to the mass storage of the remote system 104 when the system 104 is otherwise idle so as to avoid interfering with its other operations.

Note that the storage system 104 may respond to storage requests other than those generated by the system 102 during remote mode. For example, the storage system 104 may respond to read and write requests from the host system 112. Further, the storage system 104 may be configured to enter remote mode by storing redundant data at the storage system 102. Thus, the invention provides for data redundancy for both storage systems 102 and 104 without the need for additional hardware.

Storing redundant data at the remote storage system 104 increases its workload. Thus, remote mode may interfere with its ability to process requests from its own clients (e.g., host system 112). However, this situation is likely preferable to having the local system 102 enter conventional "safe mode." Further, in one aspect of the invention, the added workload resulting from remote mode may be distributed to multiple remote locations. For example, a portion of the data for write operations of the storage system 102 may be stored redundantly at storage system 104, while another portion may be stored redundantly at one or more other remote storage systems (e.g., storage system 108 of FIG. 1). Thus, the redundant data is stored in a distributed fashion. This may be accomplished by identifying all of the locations for storing the redundant data in step 302 of the method 300 (FIG. 3), along with an indication how the redundant data is to be distributed. For example, redundant data for a particular application running at host 110 may be stored at the system 104, while redundant data for a different application running at host 110 may be stored at the system 108. A configurable fraction of the remotely stored data may be stored at different storage systems.

Figure 5:
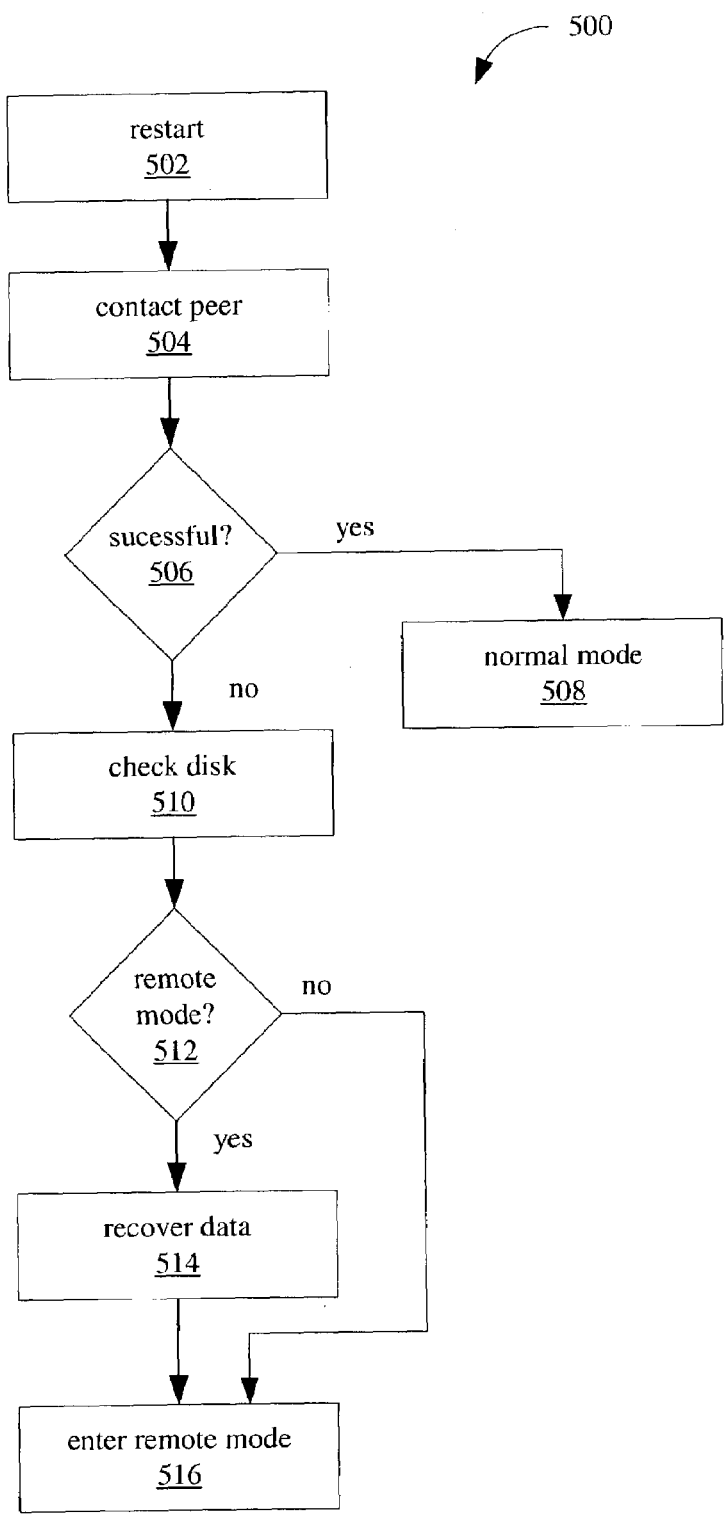
FIG. 5 illustrates a flow diagram of a method for data recovery in accordance with an aspect of the present invention.

As mentioned, it may become necessary to recover the redundant data stored at the remote location. As explained above, where a fault affects one of the cache memories 206 or 208, remote mode causes redundant data to be stored at the remote location. Should another fault occur that affects the other cache memory, the data held at that cache memory and that had yet not been written to mass storage 210 will likely no longer be present at the local storage system 102. This data may be recovered from the remote location. However, because both cache memories 206 and 208 at the system 102 have been affected, this recovery will generally only occur once at least one of them has been restored to service. FIG. 5 illustrates a flow diagram of a method 500 for data recovery as may occur after a storage system controller (e.g., controller 202 or 204 or its associated cache memory) has been restored to service.

In a step 502, the controller 202 or 204 is restored, such as by restarting. Upon restarting, it attempts to contact its peer in step 504. For example, the controller 202 will attempt to contact the controller 204. If the controller 202 is able to successfully contact its peer controller 204, this means that the peer controller 204 and its associated cache 208 was likely operational while the controller 202 was down. This determination may be made in step 506. Because the controller 204 and cache 206 were functioning, this means that it is not necessary to recover redundant data from the remote location. Accordingly, in step 508, the controller 202 may commence operation normally, in which data for the write requests is stored redundantly at the two cache memories 206 and 208.

However, if the controller 202 is unable to make successful contact with the controller 204, or if the contact indicates that a fault is affecting its associated cache memory 208, this indicates that the cache memory 208 may have been experiencing a fault before the controller 202 was restarted. In this case, the remote mode may have been entered in which the controller 204 may have stored an indication (e.g., at a location in mass storage 210) that it had entered remote mode in step 308 of FIG. 3.

Accordingly, in a step 510, the controller 202 checks this location. Alternately, rather than checking to see if the controller 204 stored an indication that it entered remote mode only if the attempted contact is unsuccessful, the controller 202 may check this location upon each start-up without first attempting contact its peer controller.

If remote mode had been entered, as determined in a step 512, this indicates that recovery of data from the remote location is necessary. Accordingly, the controller 202 contacts the storage system 104 in a step 514 and recovers the redundant data stored therein. Once the data has been recovered, the system 102 may commence operation. However, because the attempts to contact its peer in step 504 were unsuccessful, this indicates that system 102 should commence operation in remote mode. Accordingly, in a step 516, the controller 202 enters remote mode (as described in reference to FIG. 3) and commences operation in remote mode. Otherwise, if the controller 204 had not entered remote mode, as determined in step 506, this indicates that there is no data at the remote location that needs to be recovered. Accordingly, the system 102 may enter remote mode in step 516 without first having to recover any redundant data.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of redundantly storing data in a computer system comprising:

receiving a request to write data at a first storage system having an interface to a network, at least one controller, mass storage and at least two cache memories, each of the cache memories comprising non-volatile storage; and when none of the cache memories has experienced a fault, storing the data in at least two of the cache memories and in response to detection of one or more of the cache memories being affected by a fault, the first storage system forwarding data that is redundant of the data to a remotely-located second storage system via the network, the second storage system having an interface to the network, at least one controller, mass storage and at least two cache memories, each of the cache memories comprising non-volatile storage.

2. The method according to claim 1, wherein the first storage system has exactly two cache memories.

3. The method according to claim 1, wherein the first and second storage systems are selected from the group consisting of disk arrays, network file servers and database servers.

4. The method according to claim 1, further comprising forwarding additional redundant data to a third storage system, thereby distributing the redundant data and the additional redundant data among a plurality of storage systems.

5. The method according to claim 4, further comprising recovering the redundant data from the plurality of storage systems.

6. The method according to claim 1, further comprising configuring the first storage system for storing the redundant data at the second storage system prior to said forwarding the redundant data.

7. The method according to claim 6, wherein said configuring comprises storing an identification of the second storage system in the mass storage of the first storage system.

8. The method according to claim 7, wherein said configuring is performed manually.

9. The method according to claim 7, wherein said configuring is performed automatically by the first storage system.

10. The method according to claim 1, further comprising the first storage system writing the data to its mass storage after receiving a reply from the second storage system and sending a notification to the second storage system for deletion of the redundant data after the data has been written to the mass storage of the first storage system.

11. The method according to claim 10, wherein the notification is a single notification that indicates deletion of redundant data for multiple write requests.

12. The method according to claim 1, further comprising, after detecting the fault, storing a record indicating entry into remote mode.

13. The method according to claim 12, wherein the record indicating entry into remote mode is stored in the mass storage of the first storage system.

14. The method according to claim 12, further comprising recovering the redundant data from the second storage system.

15. The method according to claim 14, wherein said recovering comprises restarting a controller for the first storage system, reading the record and retrieving the redundant data from the second storage system.

16. The method according to claim 1, further comprising recovering the redundant data from the second storage system.

17. The method according to claim 1 further comprising identifying the second storage system from among a plurality of storage systems connected to the network.

18. The method according to claim 1 wherein the first storage system comprises at least two controllers.

19. The method according to claim 17 wherein the second storage system comprises at least two controllers.

20. A system for redundantly storing data in a computer system comprising a first data storage system having an interface to a network, at least one controller, mass storage and at least two cache memories, each of the cache memories comprising non-volatile storage, wherein when none of the cache memories has experienced a fault, data for a write request is stored in at least two of the cache memories, and the computer system comprising a second storage system, the second storage system having an interface to the network, at least one controller, mass storage and at least two cache memories, each of the cache memories comprising non-volatile storage, wherein in response to detection that one or more of the cache memories of the first storage system is affected by a fault, the first storage system forwards the redundant data to the second data storage system via the network.

21. The system according to claim 20 wherein the first storage system comprises at least two controllers.

22. The system according to claim 21 wherein the second storage system comprises at least two controllers.

* * * * *

UNITED STATES PATENT AND TRADEMARK OFFICE
CERTIFICATE OF CORRECTION

| | |
|---|---|
| PATENT NO. | : 7,210,061 B2 |
| APPLICATION NO. | : 10/418409 |
| DATED | : April 24, 2007 |
| INVENTOR(S) | : Eric Anderson |

It is certified that error appears in the above-identified patent and that said Letters Patent is hereby corrected as shown below:

On the title page, item (73), in "Assignee", in column 1, line 1, after "Development" insert -- Company --.

Signed and Sealed this

Fifth Day of May, 2009

JOHN DOLL
*Acting Director of the United States Patent and Trademark Office*